R.F. NONDESTRUCTIVE INTERROGATION SYSTEM FOR A MAGNETIC MEMORY

Filed July 9, 1962 3 Sheets-Sheet 1

INVENTORS.
ROBERT B. WHITSON
LEWIS L. TANGUY JR.
BY Charles R. Lepchinsky
ATTORNEY United States Patent Office 3,492,662

Patented Jan. 27, 1970

3,492,662

R.F. NONDESTRUCTIVE INTERROGATION SYSTEM FOR A MAGNETIC MEMORY

Robert B. Whitson, Wayne, and Lewis L. Tanguy, Jr., Paoli, Pa., assignors to Burroughs Corporation, Detroit, Mich., a corporation of Michigan Filed July 9, 1962, Ser. No. 208,329

The portion of the term of the patent subsequent to Aug. 27, 1985, has been disclaimed Int. Cl. G11b *5/00*

U.S. Cl. 340—174 7 Claims

This invention relates to a nondestructive memory testing system. More specifically it relates to a structure for sensing a matrix of bistable magnetic core magnets to determine their individual remanent states without changing such remanent state. The subject matter of the instant case involves a plurality of magnets, each of which has a toroidal core possessing a non-linear flux $\phi$ to current $i$ relationship and windings. In the memory embodiment the magnets are structurally considered as being arranged in rows and columns with one winding on each magnet in each row connected in series with the adjacent magnetic winding in the row and another winding on each magnet in each column also connected in series with the winding of the adjacent magnet.

In certain applications of magnetic toroidal core memories arranged in such a matrix it is desirable to simultaneously determine the remanent state of each of the magnetic cores in all of the columns without destroying the present remanent states of the individual magnetic cores. One way to accomplish this type of readout is through a system of R.F. signal testing.

This R.F. signal testing is non-destructive when the periods of the R.F. waves are very much shorter than the response times of the cores for the current magnitudes involved. The same internal mechanisms that limit the switching speed of a core driven by D.C. pulses are believed to prevent the destruction of information by R.F. currents even when the zero to peak of the R.F. excitation is made many times greater than the coercive force. If any flux switching is done during a half cycle it is immediately undone during the next half cycle. If a small D.C. bias is applied, such that the bias plus the zero to peak of the R.F. excitation exceeds the coercive force, then the core will slowly switch in the direction of the bias. In absence of a D.C. bias, however, a core may be R.F. driven indefinitely and experience only negligible deterioration of its remanent flux. For a more detailed explanation of Radio-Frequency Nondestructive Readout for Magnetic-Core Memories, see the article of that title in the IRE Transactions-Electronic Computers, December 1954, pages 12–15, by Bernard Widrow.

Each of the magnets has an approximately rectangular hysteresis loop characteristic. This is a known physical characteristic and has been used before in many related devices. The particular hysteresis characteristic required for the instant invention and essential in producing the useful result as a basis of patentability is the nonlinear flux $\phi$ to current $i$ relationship.

Accordingly, an object of the present invention is simultaneously testing the remanent condition of a plurality of magnetic toroids with a group of positive and negative test signal data.

Another object of this invention is detecting the presence and location of particular stored data in a magnetic core memory by simultaneously comparing key data with a plurality of data stored in the magnetic core memory.

Still another object of the present invention is detecting the presence and location of particular stored data in a magnetic core memory by simultaneously comparing data with a plurality of data stored in the magnetic core memory without destroying the data stored in the memory.

These and other objects of the present invention are accomplished in a magnetic core matrix memory, made up of a plurality of approximately rectangular hysteresis loop megnetic cores arranged in rows and columns, by applying a single frequency radio frequency interrogation signal to each row. Each interrogation or test signal represents a bit of a key and has a phase characteristic indicative of the binary value of the bit position it represents. Due to the nonlinear characteristic of the hysteresis loop of each magnetic core, the application of the testing signals produces at least one higher harmonic frequency, of the testing signal frequency, at each magnetic core. This is structurally shown in the U.S. Patent No. 3,075,180 of H. T. Mortimer. The phase of the interrogation signals is such that the phase of the harmonic signal at each of the cores corresponding to a particular column location is the same, i.e. in phase, whenever the data stored therein corresponds to the key column. Conversely, when the data in a particular column location differs from the key column, the harmonic signal at the cores of the particular column corresponding to the row portions of the key column containing dissimilar values is 180 degrees out of phase with the harmonic signal. Means are provided for algebraically adding the second harmonic signal appearing at each core of each column. The largest amplitude second harmonic signal will occur only at the column or columns having data stored therein that corresponds in polarity to the key column. Amplitude and phase sensing means are coupled to each column of magnetic cores for detecting the amplitude of the harmonic signal that signifies a match between the key and the data stored in the column and for producing an output signal when such a match occurs that is indicative of the presence and location of the matched location.

A more detailed description follows in conjunction with the following drawings in which.

Figure 3:
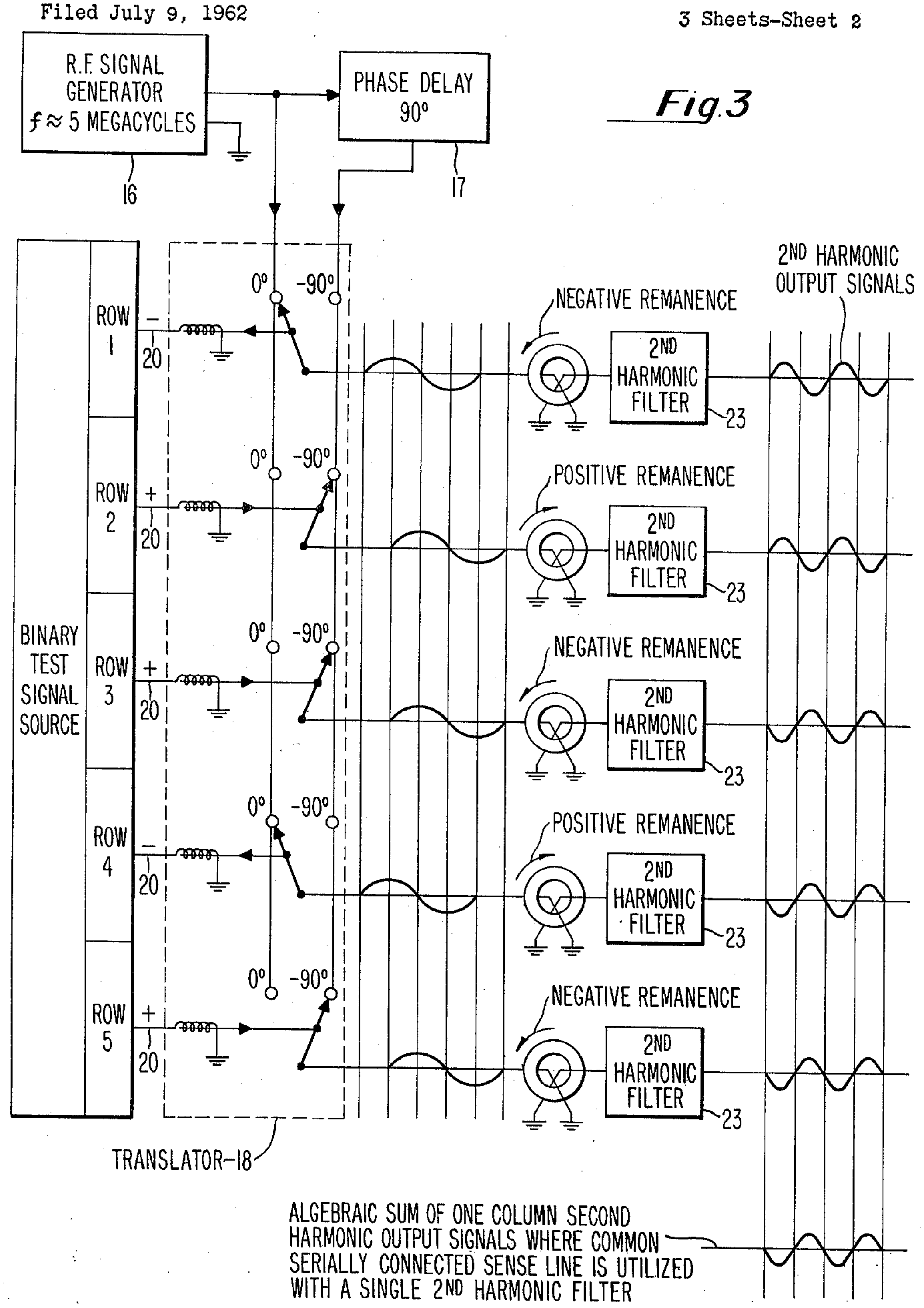
Figure 4:
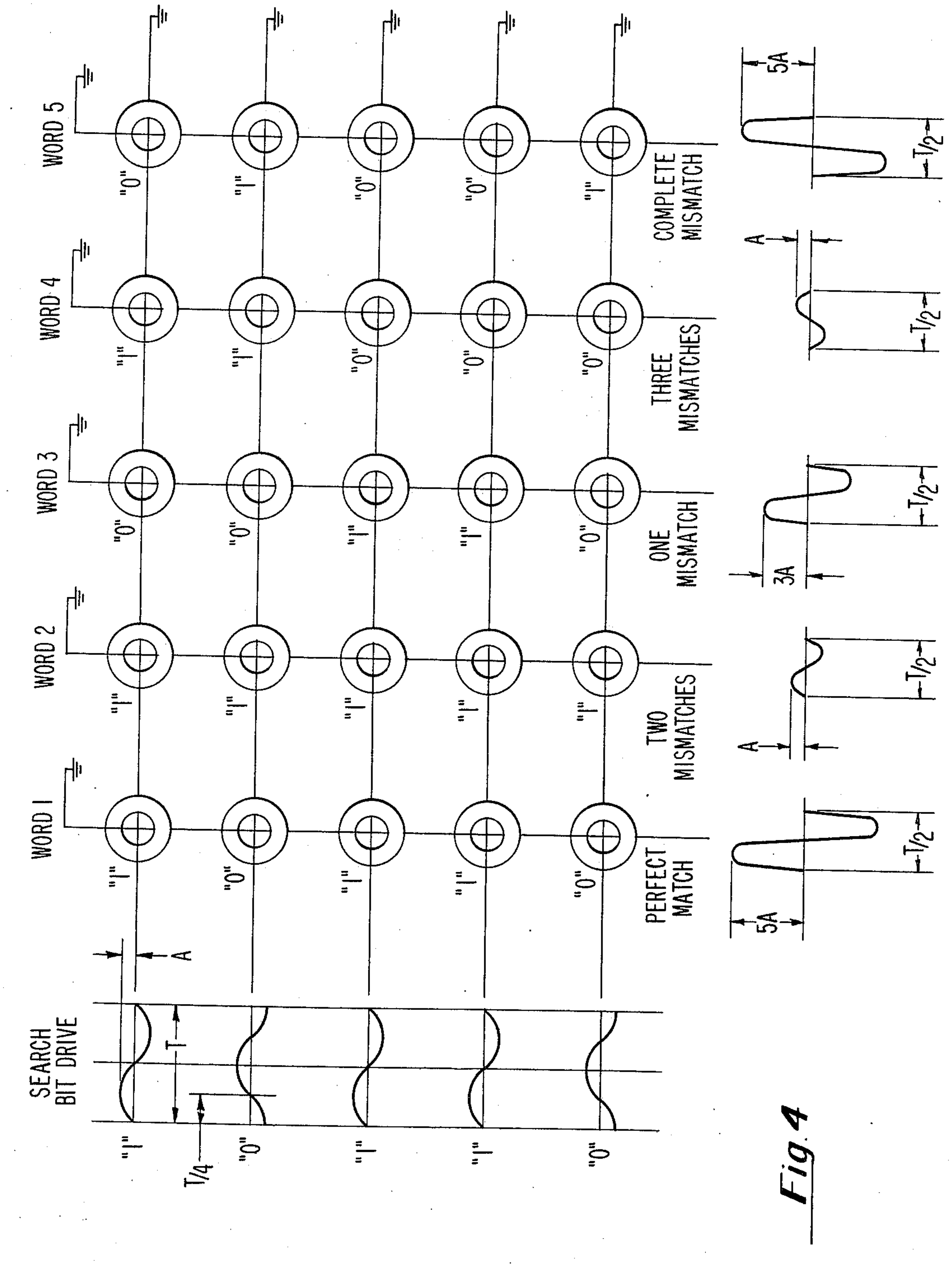

FIGURE 3 is a schematic and block diagram of one column of the memory showing waveforms at certain locations and also additional details of the signal generator, the phase shifter and the translator; and FIGURE 4 is an overall schematic of the matrix showing the application of test signal waveshapes and the presence of sense signal waveshapes at the row test and column sense conductors respectively.

Figure 1:
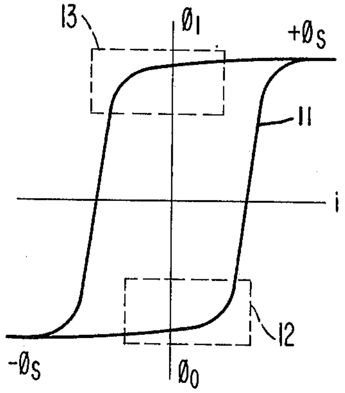
FIGURE 1 is a typical rectangular hysteresis loop characteristic of a magnetic core.

Referring now to the drawings, there is shown in FIGURE 1 a typical approximately rectangular hysteresis loop characteristic 11 for a magnetic core. Positive saturation is indicated by the reference character $+\phi_s$, and the positive remanence stable state is indicated by the reference character $\phi_1$. Negative saturation is indicated by the reference character $-\phi_s$, and the negative remanence stable state is indicated by the reference character $\phi_0$. The ordinate or vertical coordinate of FIGURE 1 represents magnetic flux $\phi$ and the abscissa or horizontal coordinate represents current $i$. When a magnetic core is switched from one stable remanence state to the other, from $\phi_0$ to $\phi_1$ for example, the path is through $\phi_0 + \phi_s$, and $\phi_1$.

Figure 1A:
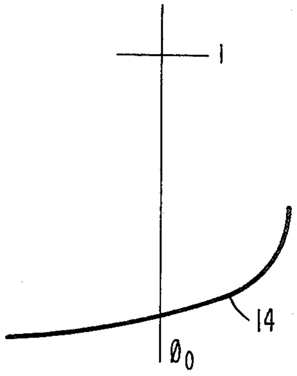
FIGURE 1A is a portion of the hysteresis loop of FIGURE 1 corresponding to one stable state of a magnetic core.
Figure 1B:
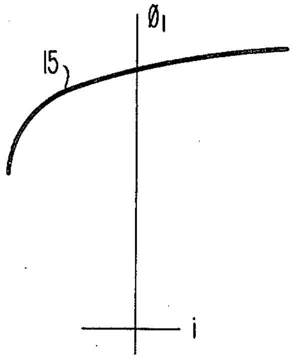
FIGURE 1B is a portion of the hysteresis loop of FIGURE 1 corresponding to the other stable state of a magnetic core.

FIGURE 1A shows the stable negative remanence portion of the hysteresis loop 11 shown within the dotted outline 12 of FIGURE 1, and FIGURE 1B shows the stable positive remanance portion of the hysteresis loop 11 shown within the dotted outline 13 of FIGURE 1. The nonlinear relationship between the flux $\phi$ and the current $i$ of FIGURE 1A can be expressed by the series:

$$\phi_o = a_1 i - a_2 i^2 + a_3 i^3 - \ldots$$

The nonlinear relationship between the flux $\phi$ and the current $i$ of FIGURE 1B or ONE stable state may be expressed by the series:

$$\phi_1 = a_1 i + a_2 i^2 + a_3 i^3 + \ldots$$

Consider now the second harmonic frequency generated by applying a radio frequency sinusoidial current to a magnetic core at the two remanent states. For $i = \sin wt$;

$$\phi_o = a_1 \sin wt - a_2 \sin^2 wt + a_3 \sin^3 wt - \ldots$$

which shows that the second harmonic equals $a_2/2 \cos 2wt$.

$$\phi_1 = a_1 \sin wt + a_2 \sin^2 wt + a_3 \sin^3 wt + \cdots$$

$$\phi_1 = a_1 \sin wt + \frac{a_2}{2} - \frac{a_2}{2} \cos 2wt + \cdots$$

which shows that the second harmonic equals $-a_2/2 \cos 2wt$.

For $i = \sin (wt - \pi/2)$ i.e. 90 degrees out of phase with the previous radio frequency signal;

$$\phi_o = a_1 \sin (wt + \pi/2) - \frac{a_2}{2} + \frac{a_2}{2} \cos (2wt + \pi)$$

which shows that the second harmonic equals $-a_2/2 \cos 2wt$.

$$\phi_1 = a_1 \sin \left(wt + \frac{\pi}{2}\right) + \frac{a_2}{2} - \frac{a_2}{2} \cos (2wt + \pi)$$

which shows that the second harmonic equals $a_2/2 \cos 2wt$. It is to be noted that the fundamental and all other higher harmonic frequencies, beside the second harmonic, are also generated. However, since the second harmonic exhibits the proper phase characteristics and has a relatively large amplitude in comparison with the higher harmonics, it is utilized in the preferred embodiment of the present invention described in detail herein below.

For purposes of describing the present invention the first radio frequency test signal is defined by $i = \sin wt$, and a second radio frequency test signal is defined by $i = \sin (wt + \pi/2)$. The frequency and amplitude of the two test signals are therefore the same but 90° out of phase with each other.

From the discussion herein above it is clear that if the first test signal is applied to a plurality of magnetic cores, some of which are set in the positive remanent state and the remainder in the negative remanent state, then the second harmonic signal generated at those cores in the positive state would be 180° out of phase with the second harmonic signal generated at those cores containing a negative remanent state. This characteristic is utilized in the present invention for detecting the presence and location of stored word data in a plurality of magnetic cores as described in detail herein below.

Figure 2:
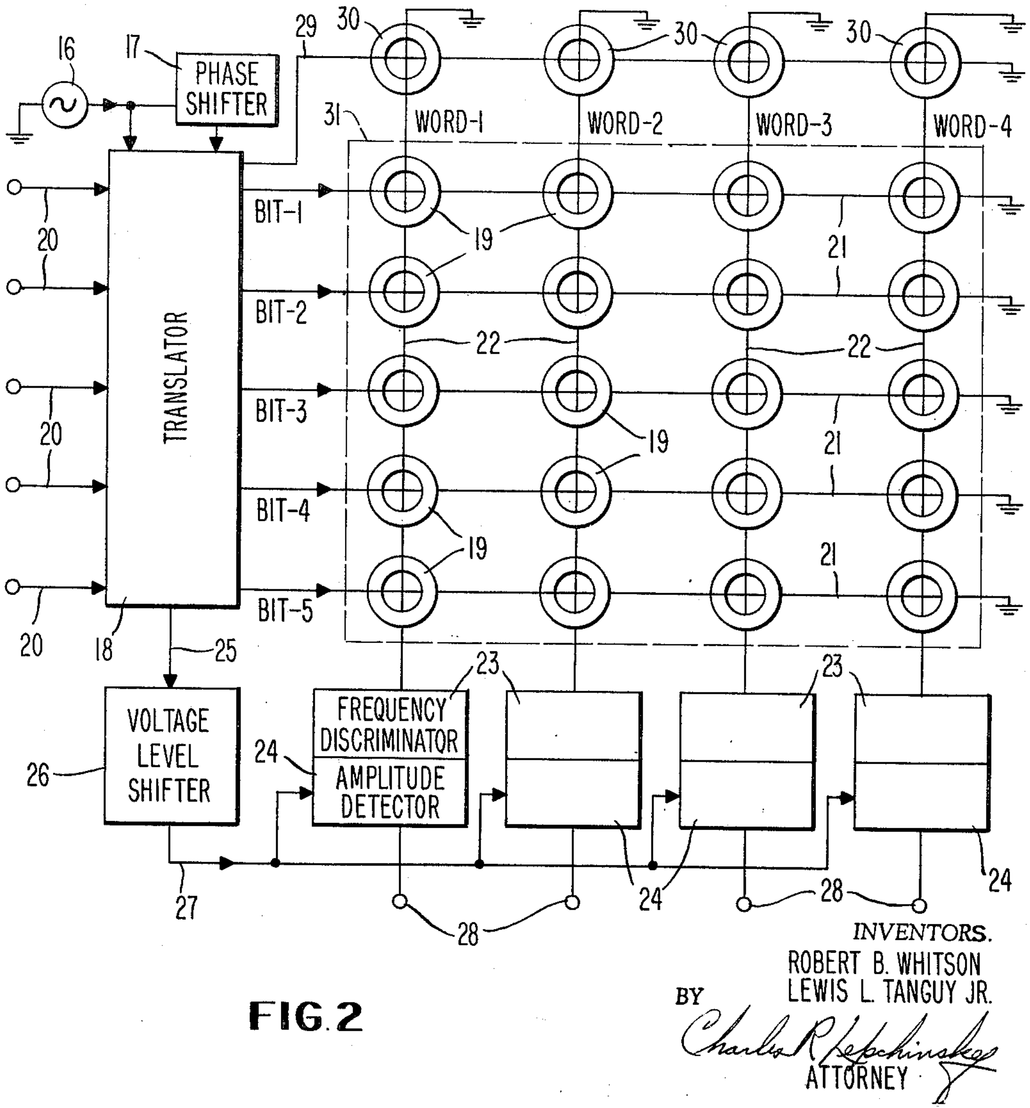
FIGURE 2 is a schematic and block diagram of an embodiment of the present invention.

Referring now to FIGURE 2, which illustrates a preferred embodiment of the present invention, there is shown a plurality of bistable magnetic devices such as magnetic cores 19, preferably having an approximately rectangular hysteresis loop characteristic such as that shown in FIGURE 1, arranged in a matrix of rows and columns as shown within the dotted outline 31. For purposes of describing this invention a matrix of four column positions having five rows is illustrated. It is to be understood that this invention is not limited to this number of rows and columns. Passing through the magnetic cores of each row is a test signal line 21 to which the single frequency test signals are applied from the translator 18. Passing through the magnetic cores of each word column is a sensing line 22 that senses the second harmonic frequency signal generated at each core in the column due to the nondestructive radio frequency test signals. Coupled to one end of each column sense line 22 is a frequency discriminator 23 the output of which is received by a phase and amplitude detector 24. This frequency discriminator 23 merely selects the second harmonic output signal while rejecting all other harmonics. It may be a band-pass filter, for example, which is a well-known device for such a task.

In order to practice the present invention, binary information must be translated into like frequency radio frequency signals having a first and a second phase characteristic. The embodiment of the present invention shown in FIGURE 2 utilizes a stable single frequency radio frequency generator 16. Since it is necessary that searching the memory with the test signal does not destroy the present remanent conditions in the memory, the frequency of the signal generator 16 must have a period very much shorter than the response time of the magnetic cores 19 for the current magnitudes involved. In this manner as previously noted any flux switching of a magnetic core that may tend to occur, due to the radio frequency interrogation signals, during any half cycle will be cancelled out during the next half cycle, thereby preventing any remanent condition of the cores in the memory from being modified or destroyed. A frequency of 5 megacycles as an operative example may be used without producing objectionable core loses. This frequency also permits a rapid repetition rate when consecutively searching for a match between stored data and various columns and test signals.

A portion of the output of the frequency generator 16 is fed directly into the translator 18 to provide the test signals of first phase. Another portion of the frequency generator 16 output passes through a phase shifter 17 before it enters the translator 18. The phase shifter 17 will shift or delay the phase of the frequency generator signal by 90 degrees thereby providing the test signals of the first phase. Each time a key column is compared with the data stored in the magnetic core 19 matrix shown within the dotted outline 31, a reference phase signal is supplied by the translator 18, by way of lead 29, to a plurality of magnetic cores 30 each associated with a core column. Notice that each magnetic core 30 is threaded by the sense line 22 of its associated column. The magnetic cores 30 do not constitute a part of the matrix shown within the dotted outline 31. The function of these cores will be explained fully below, however, it should be stated at this point that a fixed positive remanent state is permanently stored in each of the magnetic cores 30.

The signals constituting the positions of the test column are applied in parallel to the translator 18 by way of the leads 20. Each lead 20 corresponds to an individual single portion of the test column.

A voltage level shifter 26 receives an input signal from the translator 18 along lead 25 and the output signal of the voltage level shifter 26 is applied by way of lead 27 to each of the amplitude detectors 24. As explained in detail hereinafter below, the voltage level shifter is utilized whenever it is desirable to search only a portion of each column of data stored in the magnetic core memory.

The embodiment of the present invention shown in FIGURE 2 utilizes a stable single frequency radio frequency generator 16. Since it is necessary that testing each magnet with the sinusoidal test frequency does not destroy the magnetic remanence, the frequency of the signal generator 16 must have a time period very much shorter than the response time of the magnetic cores 19 for the current magnitudes involved. In this manner any flux switching of a magnetic core that may tend to occur, due to the radio frequency signals during any half cycle, will be cancelled out during the next half cycle thereby preventing any stored magnetic remanence from being destroyed.

The operation of the embodiment of the present invention shown in FIGURE 2 is such that, initially, data is entered into each column of the magnetic core 19 matrix memory in the form of positive and negative remanent states and a positive remanent state is permanently stored in the magnetic cores 30. As is well known to those skilled in the art, various techniques have been devised for accomplishing such storage of data. Accordingly, a description of such techniques and electrical circuits therefor need not be discussed herein since they form no part of the present invention. Whenever it is necessary to test the stored data for a particular column of information, a plurality of test signals are applied to the translator 18 by way of the bit leads 20. These test signals may be derived manually such as from a manual keyboard, or may be supplied by various circuits of an electronic computer. The function of the translator 18 is to apply the appropriate phase of a single frequency radio frequency signal to the proper row line 21 in response to the presence of a positive or negative voltage level at the input to that row location. For example, if the first signal of the test column is a positive value, the translator 18 will switch a portion of the reference frequency output, i.e., $i=\sin wt$, of the frequency generator 16 to the first row line 21. If the second signal of the test column is a negative value, the translator 18 will switch a portion of the 90 degrees phase shifted output, i.e. $i=\sin (wt+\pi/2)$, of the frequency generator 16 to the second row line 21. Since the signals of the test column arrive at the translator 18 simultaneously, the single frequency interrogation signals shown, having an appropriate phase characteristic, appear on the row lines 21 simultaneously.

Refer now to FIGURE 3 of the drawings.

In this figure, a more detailed illustration of the translator 18 is shown together with the input waveforms to each of the rows of the matrix shown in FIGURE 2. The contents of the translator are merely a suggested embodiment and any means responsive to the polarized input signals 20 to apply one or the other phases from the R.F. signal generator 16 or the phase shifter 17 to the respective rows of cores may be used. Of course, the mechanical switches shown are symbolic in order to simplify the explanation. Numerous other switching combinations using transistors, etc. will suggest themselves to those skilled in the electronic art.

Returning to FIGURE 3, it is readily seen that the application of a positive signal to a selected one of the switching relays of the translator will cause the row switch to apply, for example, the output of the R.F. signal generator directly to the corresponding row of magnetic cores. While, conversely, the application of a negative signal to the same switching means will cause the output of the phase shifting means 17 to be applied to the corresponding core row.

By simultaneously applying a column of direct current signals, of predetermined polarities, to the column of switching means contained in the translator, it is seen that each of the rows of the matrix receives a given R.F. signal. This is more easily appreciated by reference to FIGURE 4.

In FIGURE 4, the matrix of core magnets are shown each having a particular state of stored remanence. The connotation "1" indicates a stored positive remanence, while the connotation "0" indicates a reverse or negative remanence. The R.F. waveforms shown down the left-hand side of the figure indicate the signals received from the switching means of the translator.

As opposed to the individual core output waveforms shown in FIGURE 3, the embodiment shown in FIGURE 4 has a single common sense line successively coupled to each of the cores of a single column. Consequently, the waveforms shown across the bottom of the figure illustrate the respective algebraic sums accumulated in each of the columns of the matrix.

Assume that a column of test signals has been applied to the translator 18 and that the remanent data stored in the first column matches the denoted phase signals applied. As explained herein above, the test signal applied to each row will create a second harmonic frequency signal in the sense line 22 at each magnetic core 19, comprising the column, which is in phase because the stored data corresponds to the column of test signals. Since each of the magnetic cores 30 outside of the matrix are set into the positive remanent state, a test signal of 0° phase, applied to them by the translator 18 over the lead 29, will produce a second harmonic signal at each core 30 that is in phase with the second harmonic signal produced at the remaining positions in the associated column. These second harmonic frequency signals are induced in the sense line 22 associated with the first column WORD-1. Because the second harmonic signals are in phase, they will add algebraically to produce a single larger amplitude signal. For example, if each bit core of the column WORD-1 produces one unit of amplitude of second harmonic frequency signal, then a six unit amplitude second harmonic signal appears on the sense line 22 associated with the first column because there are five bits per column. The other unit of amplitude is provided by the magnetic core 30, which is not a part of the magnetic core matrix, associated with the first column WORD-1 and which is threaded by the sense line 22 of the first column.

Assume now that the data stored in the second column WORD-2 has a remanent condition in one position that differs from the corresponding position of the key column, all the remaining positions of the column and the stored data being the same. The second harmonic signal generated at each core position having therein will be in phase with each other thereby producing a second harmonic signal in the sense line 22 associated with the second column WORD-2 having four units of amplitude indicative of the four matched positions. One more unit of amplitude is added by the magnetic core 30 associated with the second column thereby producing a five unit amplitude in phase second harmonic signal. As explained previously herein above, the second harmonic frequency signal generated at the core corresponding to the unmatched bit position will be 180 degrees out of phase with the five unit amplitude second harmonic signals. These signals will add algebraically in the sense line 22 associated with the second column which results in a four unit amplitude second harmonic frequency signal.

When the data stored in a column is the exact opposite of the key column, a five unit amplitude second harmonic signal, indicative of the five mismatched bit positions, is produced in a sense line 22 that is 180 degrees out of phase with the one unit amplitude second harmonic signal produced by the associated magnetic core 30 outside of the matrix; which results in a four unit amplitude second harmonic signal. It is clear that if the magnetic cores 30 were not present, a matched and completely mismatched condition would produce equal amplitude second harmonic signal 180 degrees out of phase with each other.

From the above, it becomes clear that the presence and location of data stored in the columns that match a key test column may be detected by sensing the amplitude of the second harmonic frequency signal that appears on the sense lines 22. As disucssed herein above, the fundamental and other higher harmonic frequencies, other than the second harmonic, are also produced at each core due to the nonlinearity of the hysteresis loop characteristic at the two stable states. Before detecting the amplitude of the second harmonic frequency signal, it is desirable that these other frequency signals be eliminated. FIGURE 2 shows a plurality of frequency discriminating devices 23 each coupled to one of the sense lines 22. The function of the frequency discriminator 23 is to block all frequencies except the second harmonic frequency. As is well known to those skilled in the art, various circuits exist for accomplishing this function. For example, tuned amplifiers or frequency filters may be used to block the passage of all but the second harmonic frequency signal. As previously noted these are well-known devices and require no further explanation to those skilled in the art.

The output of each frequency discriminator is applied to an associated amplitude detector 24 which produces an output signal on an associated output terminal 28 whenever it receives a second harmonic signal having an amplitude that indicates a match between the test column and data stored in the associated memory column. The output signal on an output terminal 28 signifies the presence and location of a matched column. Such an amplitude detector could be any one of a number of well-known threshold devices in which no output signal exists until the input exceeds a particularly selected level of amplitude.

As will be obvious to those skilled in the art, many existing circuits may be utilized as an amplitude detector 24. For example, a diode detector may be used to provide a D.C. level signal whose magnitude is proportional to the amplitude of the second harmonic frequency signal. This D.C. level signal may then be applied to a normally nonconducting vacuum tube or transistor which will be rendered conducting by a D.C. level signal indicative of an amplitude of second harmonic frequency signal corresponding to a match condition. Once the matched locations are detected, the data stored therein may be read out by a variety of well known techniques that need not be described herein.

For certain applications it may be desirable to mask portions of the key test column. This occurs when it is necessary to search for a match between a key column having fewer row portions than the number of rows in the stored data. For example, during a masked operation it may be desirable to interrogate only three out of the five rows shown in FIGURE 2. It is obvious that for this example the second harmonic frequency amplitude signal indicative of a matched condition will contain only four units of amplitude. It then becomes necessary for the amplitude detectors 24 to respond to four units of amplitude signifying a matched condition rather than six units of amplitude when no masking takes place. Thus, for this condition, the threshold level is reduced accordingly. This can be accomplished by the translator 18 applying a signal, indicative of the number of masked portions, by way of lead 25 to the voltage level shifter 26. The output of the voltage level shifter 26 is applied by way of lead 27 to each amplitude detector 24. This output will shift the operating point of each amplitude detector an amount such that four units of second harmonic amplitude will produce an output from the amplitude detectors indicative of a matched condition.

This may be realized in various ways with well known binary techniques. For example, if a positive pulse represents a binary ONE bit of the key word is applied to the translator 18 by way of leads 20 and a binary zero by an absence of a pulse, then a negative pulse on any of the leads 20 can indicate that the particular bit position is masked. The translator 18 can provide a D.C. output on lead 25, indicative of the number of masked bits, which is applied to the voltage level shifter 26 which may be an amplifier. The output of the voltage level shifter 26 can be applied to the bias circuit of the normally nonconducting device included in the amplitude detector 24 by way of lead 27. This output has such a level that the nonconducting device will become conductive, indicating a matched condition, upon the application of a D.C. signal indicative of three units of second harmonic frequency signal.

As the number of cores per column increase, it becomes more difficult for the amplitude detectors 24 to distinguish between a perfectly matched condition and a column having one position unlike the key column, due to the relatively small difference in amplitude of the second harmonic frequency signal for these two cases. This problem may be alleviated by using an oscillator 16 having extremely stable amplitude characteristics and by choosing the material and geometric shape of the magnetic cores 19 such that each core generates substantially the same amplitude second harmonic frequency signal.

From the discussion hereinabove it is clear that, if some magnets have positive remanence and some negative remanence, those which are arranged in a column with their pickup coils in series circuit will generate in such series coils, in phase second harmonic currents when identical sinusoidal test frequencies are applied to the $n$ series coils of the rows, when the core remanence states are identical. However, there will be produced second harmonic currents 180° out of phase in such column series coiled if the remanence states are some positive and some negative. Further, if two magnets in a column have opposite remanence states, and the two sinusoidal test frequencies applied to them are identical except that they are 90° out of phase then the produced second harmonic currents will be in phase. This characteristic is utilized in the present invention for detecting whether all magnets in a column have a particular combination or positive and/or negative remanence states.

What we claim is:

1. Apparatus for simultaneously testing the remanent condition of a plurality of magnetic cores without switching the cores comprising:

(a) at least two magnetic cores each capable of being switched to a positive and a negative stable state of magnetic remanence,
(b) a separate test conductor passing through each of said cores,
(c) a single sense conductor commonly passing through all of said cores,
(d) means for generating a single R.F. signal frequency having a period substantially shorter than the response times of the cores for the current amplitudes involved, and including means for also providing a phase shifted version of said signal frequency,
(e) a test signal source to provide a positive or a negative test signal for each of said separate test conductors,
(f) a translating means connected between said test signal source, said R.F. signal frequency generating means, and said plurality of test conductors to apply said signal frequency or its phase shifted version to each of said test conductors in response to the respective positive or negative test signal associated with that conductor,
(g) means for selectively passing the second harmonic signal of said R.F. signal frequency connected to said single sense conductor, and
(h) means for indicating the amplitude of said second harmonic signal relative to the amplitude of its fundamental signal frequency to thereby indicate the relative correspondence between the polarity of said test signals and the direction of remanence of all of said cores without destroying their existing remanent conditions.

2. The apparatus as set forth in claim 1 wherein the phase angle between said R.F. signal frequency and its phase shifted version is 90°.

3. Apparatus for simultaneously testing the remanent condition of a plurality of cores arranged in a matrix of $m$ rows and $n$ columns without switching the cores comprising:

(a) a plurality of $(m)$ x $(n)$ magnetic cores, each of which possesses a non-linear flux $\phi$ to current $i$ characteristic and each of which may be switched between a positive and a negative remanent state,
(b) an $m$ plurality of test conductors, serially threaded, one conductor per row, through all of the cores in each of the $m$ rows,
(c) an $n$ plurality of sense conductors serially threaded, one conductor per column, through all of the cores in each of the $n$ columns, (d) an R.F. signal generator capable of generating an initial test signal having a period which is shorter than the switching response times of the cores in the matrix, said generator also including means for generating a phase shifted test signal, which is an angularly displaced version of the initial test signal, (e) an $m$ plurality of direct current signals of predetermined polarities, (f) a translating means connected between said $m$ direct current signals, said initial and phase displaced test signals and said $m$ test conductors, the respective polarities of said $m$ direct current signals simultaneously enabling each of said test conductors to be connected to the initial R.F. test signal or the angularly displaced test signal, (g) an $n$ plurality of frequency selection means, each respectively connected to one of said $n$ plurality of sense conductors, and (h) an $n$ plurality of amplitude indicating means respectively connected to each of said frequency selection means to simultaneously indicate the amplitude of the algebraic sum of the sensed signals in each of the $n$ columns in response to the application of the initial or the angularly displaced test signal to each row of said $m$ rows of cores.

4. The apparatus as set forth in claim 3 wherein said translating means includes an $m$ plurality of bidirectional switching means respectively coupled to the $m$ plurality of polarized direct current signals for individual activation in a first direction upon receipt of a negatively polarized direct current signal and in a second direction upon receipt of a positively polarized direct current signal, the activation of a selected switch in a first direction connecting said initial test signal to a correspondingly selected one of said $m$ core rows and the activation of said switch in a second direction alternately connecting the phase displaced test signal to that selected row.

5. An associative memory system including a nondestructive testing apparatus comprising:

(a) a plurality of ($m$) x ($n$) magnetic mores, arranged in a matrix of $n$ rows and $m$ columns, each of which possesses a non-linear flux $\phi$ to current $i$ relationship and each of which may be switched between a positive and a negative state, (b) an $m$ plurality of test conductors, one of which is serially threaded through all of the cores in each of the $m$ rows, (c) an $n$ plurality of sense conductors, one of which is serially threaded through all of the cores in each of the $n$ columns, (d) an R.F. signal generator capable of generating a signal having a period which is shorter than the switching response times of the cores in the matrix, (e) a phase shifting means connected to said R.F. signal generator to produce an angularly displaced version of the initial R.F. signal, (f) an $m$ plurality of direct current signal of predetermined polarities, (g) a translating means connected between said $m$ direct current signals, said R.F. signal generator, said phase shifting means and said $m$ test conductors, the respective polarities of said $m$ direct current signals simultaneously enabling each of said test conductors to be connected to the R.F. signal generator to receive the initial R.F. signal or to the phase-shifting means to receive the angularly displaced signal, (h) an $n$ plurality of second harmonic selection means each respectively connected to one of said $n$ plurality of sense conductors, and (i) an $n$ plurality of summing means respectively connected to each of said second harmonic selection means to simultaneously indicate the amplitude of the algebraic sum of the sensed second harmonic signals in each of the $n$ columns in response to the initial test signal or its angularly displaced version to each of said $m$ rows of cores.

6. The apparatus as set forth in claim 5 wherein each of said $n$ columns has an additional square loop magnetic core having a fixed reference remanent state, said translating means includes a further means for providing an additional row of said R.F. test signals, and an additional test conductor is serially threaded through the newly created row and connected to said further means of the translator.

7. An associative memory with non-destructive test characteristics comprising:

(a) a plurality of square loop magnetic cores arranged in a matrix of $n$ rows and $m$ columns, (b) each of said cores having a test winding and a sense winding wound thereon, (c) the test winding on each of said cores serially connected to the test winding of the adjacent cores in the row to provide an $n$ plurality of row test conductors through the rows of the matrix, (d) the sense winding on each of said cores is serially connected to the sense winding of the adjacent cores in the column to provide an $m$ plurality of column sense conductors through the columns of the matrix, (e) an R.F. signal generator having an output signal frequency whose period is substantially shorter than the switching response time of each of the magnetic cores, (f) a 90° phase delay device connected to said R.F. generator to provide a signal which is an angularly displaced version of the signal generator output signal, (g) a plurality of direct current test signals, each of a predetermined polarity, (h) a plurality of bidirectional switching means individually connected for activation to said plurality of direct current test signals, (i) said plurality of switching means further connected between said R.F. signal generator, said 90° phase delay device and said $n$ plurality of row test conductors to selectively provide each of said test conductors with the output signal from said signal generator or the output signal from said delay device, in accordance with the predetermined polarities of said direct current test signals, (j) selective wave filters capable of passing the second harmonic of the generated R.F. signal, respectively connected to each of said $m$ plurality of sense conductors, and (k) an amplitude indicator respectively connected to each of said wave filters to provide the algebraic summation of the plurality of second harmonic signals sensed by each column of sense windings in response to the test signals applied to said rows of the matrix.

References Cited

UNITED STATES PATENTS

| | | | |
|---|---|---|---|
| 3,075,180 | 1/1963 | Mortimer | 340—174 |
| 3,075,181 | 1/1963 | Takashi Ishidate | 340—174 |
| 3,155,945 | 11/1964 | Keefer | 340—146.2 |
| 3,100,890 | 8/1963 | Henning | 340—345 |

JAMES W. MOFFITT, Primary Examiner

U.S. Cl. X.R.

324—34; 340—146.2